United States Patent
Fan et al.

(10) Patent No.: US 11,477,420 B2
(45) Date of Patent: Oct. 18, 2022

(54) ILLUMINATION SYSTEM AND PROJECTION DEVICE

(71) Applicant: Coretronic Corporation, Hsin-Chu (TW)

(72) Inventors: Chen-Wei Fan, Hsin-Chu (TW); Yi Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/489,634

(22) Filed: Sep. 29, 2021

(65) Prior Publication Data

US 2022/0141433 A1 May 5, 2022

(30) Foreign Application Priority Data

Oct. 29, 2020 (CN) .......................... 202022449581.0

(51) Int. Cl.
| | | |
|---|---|---|
| *G03B 21/14* | (2006.01) | |
| *G03B 21/28* | (2006.01) | |
| *G03B 21/20* | (2006.01) | |
| *H04N 9/31* | (2006.01) | |

(52) U.S. Cl.
CPC ......... *H04N 9/3161* (2013.01); *G03B 21/204* (2013.01); *G03B 21/208* (2013.01); *G03B 21/28* (2013.01); *H04N 9/3102* (2013.01); *G03B 21/2033* (2013.01)

(58) Field of Classification Search
CPC .. G03B 21/14; G03B 21/208; G03B 21/2033; G03B 21/204; H04N 9/31; H04N 9/3108; H04N 9/3102; H04N 9/3111; H04N 9/3114; H04N 9/3117

USPC ........................................ 353/31, 33, 34, 37
See application file for complete search history.

(56) References Cited

U.S. PATENT DOCUMENTS

| | | | | |
|---|---|---|---|---|
| 10,782,603 | B2 * | 9/2020 | Dai ...................... | H04N 9/3158 |
| 11,099,470 | B2 * | 8/2021 | Chou ................. | G03B 21/2033 |
| 2019/0384150 | A1 | 12/2019 | Tsai | |
| 2020/0004122 | A1 * | 1/2020 | Dai ...................... | G03B 21/204 |
| 2022/0197126 | A1 * | 6/2022 | Hu ....................... | G03B 21/204 |

FOREIGN PATENT DOCUMENTS

| | | |
|---|---|---|
| CN | 102540678 | 7/2012 |
| CN | 104460202 | 3/2015 |
| CN | 110068906 | 7/2019 |
| CN | 210142253 | 3/2020 |

* cited by examiner

*Primary Examiner* — William C. Dowling
(74) *Attorney, Agent, or Firm* — JCIPRNET

(57) ABSTRACT

The disclosure provides an illumination system and a projection device applying the illumination system. The illumination system includes a laser light source, a wavelength conversion module, and a spot region modulation module configured to shift a transmission path of a laser beam. When the wavelength conversion module rotates, the spot region modulation module moves, in a first period of time, the laser beam in a wavelength conversion region of the wavelength conversion module along a first shift path, so that the laser beam forms a first spot region in an irradiation region in the wavelength conversion region. The spot region modulation module causes, in a second period of time, the laser beam to form a second spot region in an irradiation region in a non-conversion region of the wavelength conversion module. A size of the first spot region is greater than a size of the second spot region.

20 Claims, 7 Drawing Sheets

ILLUMINATION SYSTEM AND PROJECTION DEVICE

CROSS-REFERENCE TO RELATED APPLICATION

This application claims the priority benefit of China application serial no. 202022449581.0, filed on Oct. 29, 2020. The entirety of the above-mentioned patent application is hereby incorporated by reference herein and made a part of this specification.

BACKGROUND

Technical Field

The disclosure relates to an optical system and an optical device, and in particular, to an illumination system and a projection device.

Description of Related Art

Recently, projection devices of solid-state lighting such as a light-emitting diode (LED) and a laser diode gradually win a place in the market. Since the laser diode has luminous efficiency higher than about 20%, in order to avoid the light source limitation of the light-emitting diode, models with a laser light source as the light source required by a projector have been gradually developed.

Generally speaking, a projection device using a laser light source as the light source includes optical systems such as an illumination system, a light valve, a projection lens (P-Lens), etc. The illumination system includes optical elements such as a light source, a wavelength conversion module, a filter module, a light homogenization element, etc. In detail, the filter module of the illumination system may be disposed on a light source and on a rear optical path of the wavelength conversion module, so that predetermined colored light can be filtered out from colored light of different bands from the wavelength conversion module after passing through the filter module, to purify color and achieve color saturation. The colored light purified by the filter module is subsequently transmitted to the light homogenization element to be transmitted to the subsequent light valve, and projected onto a screen through the projection lens.

In detail, in the related art, to shape a spot of a laser beam, one fly eye lens is usually placed in front of a light source. In this way, a spot incident on a wavelength conversion region of the incident wavelength conversion module can be effectively enlarged to further improve conversion efficiency of the wavelength conversion module. However, in this case, a blue spot incident on a non-conversion region of the wavelength conversion module without wavelength conversion is also enlarged. In addition, the colored light of different bands from the wavelength conversion module has different light receiving angles. As a result, when the blue spot without wavelength conversion enters the light homogenization element, light receiving efficiency of the light homogenization element is likely to be poor.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides an illumination system and a projection device with good optical efficiency.

Other objectives and advantages of the disclosure can be further understood from the technical features disclosed by the disclosure.

In order to achieve one or some or all of the above purposes or other purposes, an embodiment of the disclosure provides an illumination system. The illumination system includes a laser light source, a wavelength conversion module, and a spot region modulation module. The laser light source is configured to provide a laser beam. The wavelength conversion module is located on a transmission path of the laser beam. The wavelength conversion module has a wavelength conversion region and a non-conversion region, and is configured to rotate on a rotation axis to cause the wavelength conversion region to enter the transmission path of the laser beam in a first period of time and to cause the non-conversion region to enter the transmission path of the laser beam in a second period of time. The spot region modulation module is located on the transmission path of the laser beam between the wavelength conversion module and the laser light source. The spot region modulation module is configured to shift the transmission path of the laser beam. When the wavelength conversion module rotates, the spot region modulation module moves, in the first period of time, the laser beam in the wavelength conversion region along a first shift path, so that the laser beam forms a first spot region in an irradiation region in the wavelength conversion region. The spot region modulation module causes, in the second period of time, the laser beam to form a second spot region in an irradiation region in the non-conversion region. A size of the first spot region is greater than a size of the second spot region.

In order to achieve one or some or all of the above purposes or other purposes, an embodiment of the disclosure provides a projection device. The projection device includes the above illumination system, a light valve, and a projection lens. The illumination system is configured to provide an illumination beam. The light valve is located on a transmission path of the illumination beam, and is configured to convert the illumination beam into an image beam. The projection lens is located on a transmission path of the image beam, and is configured to project the image beam out of the projection device.

Based on the above, the embodiments of the disclosure have at least one of the following advantages or effects. In the embodiments of the disclosure, in the first period of time, the illumination system and the projection device can expand an actual first spot region irradiating on the wavelength conversion region through the disposed spot region modulation module, thereby improving conversion efficiency of the wavelength conversion module. In addition, in the second period of time, through the disposed spot region modulation module, an actual region irradiated on the non-conversion region can be kept close to an original spot region of the laser beam or kept to be a second spot region smaller than the first spot region, thereby improving light receiving efficiency when the laser beam enters the light homogenization element. In this way, through the disposed spot region modulation module, consideration can be given to both the conversion efficiency of the wavelength conversion module and the light receiving efficiency of the light homogenization element, so that the illumination system and the projection device have good optical efficiency, an optical path structure can be simplified, and a system volume can be reduced.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
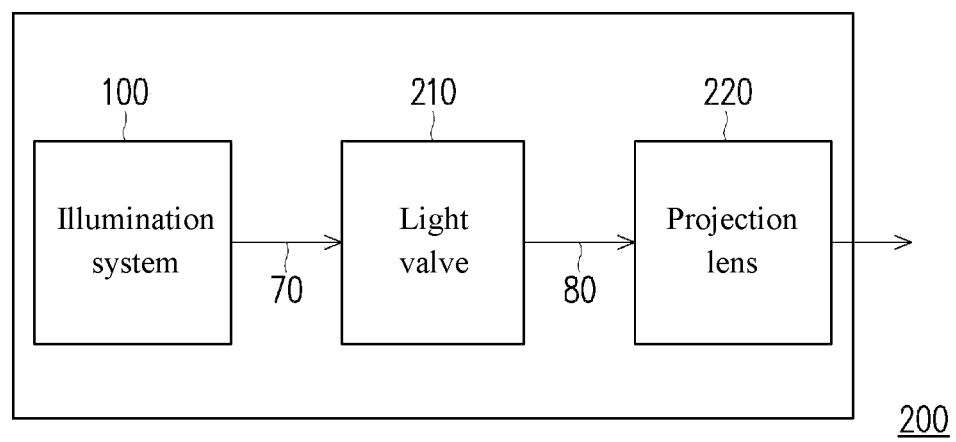
FIG. 1 is a block diagram of a projection device according to an embodiment of the disclosure.
Figure 2:
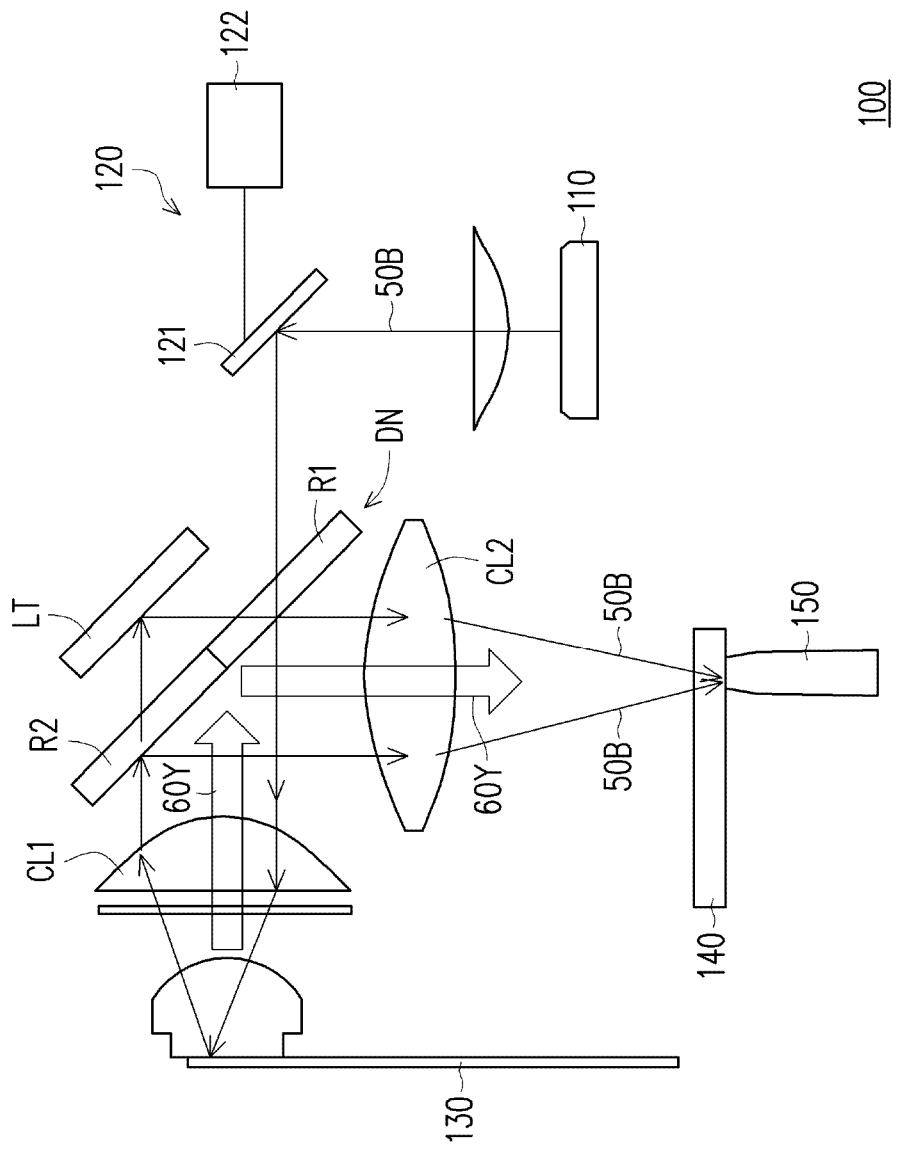
FIG. 2 is a schematic structural diagram of a projection device according to an embodiment of the disclosure.
Figure 3:
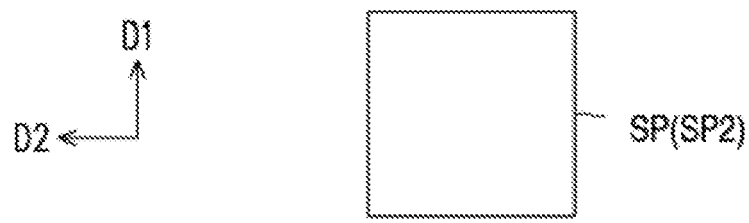
FIG. 3 is a schematic diagram of a spot of a laser beam.
Figure 4:
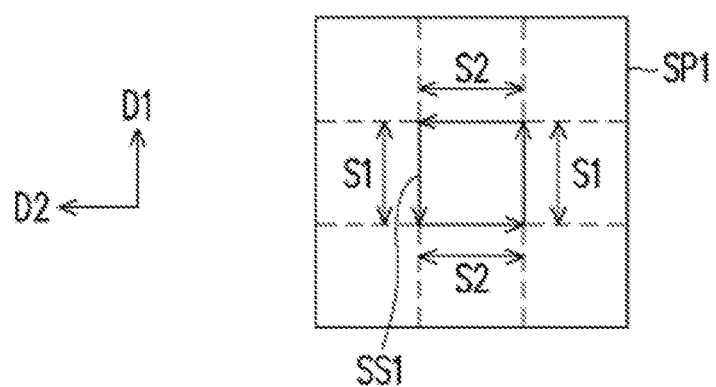
FIG. 4 is a schematic diagram of a first shift path of a laser beam and a first spot region formed by the laser beam.

FIG. 1 is a block diagram of a projection device according to an embodiment of the disclosure. FIG. 2 is a schematic structural diagram of a projection device according to an embodiment of the disclosure. FIG. 3 is a schematic diagram of a spot of a laser beam. FIG. 4 is a schematic diagram of a first shift path of a laser beam and a first spot region formed by the laser beam. Referring to FIG. 1, a projection device 200 includes an illumination system 100, a light valve 210, and a projection lens 220. The illumination system 100 is configured to provide an illumination beam 70. The light valve 210 is disposed on a transmission path of the illumination beam 70 from the illumination system 100, and is configured to convert the illumination beam 70 into an image beam 80. The projection lens 220 is disposed on a transmission path of the image beam 80, and is configured to project the image beam 80 out of the projection device 200. In the present embodiment, there is one light valve 210, but the disclosure is not limited thereto. In other embodiments, there may be a plurality of light valves 210. In addition, in the present embodiment, the light valve 210 may be a digital micro-mirror device (DMD) or a liquid-crystal-on-silicon panel (LCOS panel). However, in other embodiments, the light valve 210 may also be a transmissive liquid crystal panel or other beam modulators.

The projection lens 220 includes, for example, a combination of one or more dioptric optical lenses including, for example, various combinations of non-planar lenses such as a biconcave lens, a biconvex lens, a concave-convex lens, a convex-concave lens, a plano-convex lens, and a plano-concave lens. In an embodiment, the projection lens 220 may further include a planar optical lens to project an image beam 80 from the light valve 210 out of the projection device 200 in a reflective or transmissive manner. A form and a type of the projection lens 220 are not limited in the disclosure.

In detail, as shown in FIG. 2, in the present embodiment, the illumination system 100 includes a laser light source 110, a spot region modulation module 120, a beam splitting element DN, a wavelength conversion module 130, a first condenser lens CL1, a light transmission element LT, a filter module 140, a second condenser lens CL2, and a light homogenization element 150. In the present embodiment, the laser light source 110 is configured to provide a laser beam 50B. For example, in the present embodiment, the laser beam 50B is a blue laser beam, and the laser light source 110 may include a plurality of blue laser diodes arranged in an array, but the disclosure is not limited thereto.

Further, as shown in FIG. 2, in the present embodiment, the light splitting element DN has a first region R1 and a second region R2. For example, in the present embodiment, the first region R1 of the light splitting element DN may be penetrated through by a blue beam but reflects beams of other colors (such as red, green, yellow, etc.). In other words, the first region R1 of the beam splitting element DN may be penetrated through by the blue laser beam 50B.

In addition, as shown in FIG. 2, in the present embodiment, the beam splitting element DN and the first condenser lens CL1 are located on a transmission path of the laser beam 50B. The beam splitting element DN is located between the laser light source 110 and the wavelength conversion module 130, and the first condenser lens CL1 is located between the light splitting element DN and the wavelength conversion module 130. In this way, when the laser beam 50B penetrates the first region R1 of the beam splitting element DN, the laser beam 50B may be obliquely incident on the wavelength conversion module 130 through the first condenser lens CL1.

Further, in the present embodiment, the wavelength conversion module 130 further includes a first actuator (not shown) configured to drive the wavelength conversion module 130 to rotate on a rotation axis, thereby causing at least one wavelength conversion region (not shown) and a non-conversion region (not shown) to enter the transmission path of the laser beam 50B at different periods of time, so as to selectively reflect or convert the laser beam 50B into at least one converted beam 60Y. In other words, in the present embodiment, the wavelength conversion module 130 may control, by using the first actuator, the period of time during which the at least one wavelength conversion region (not shown) of the wavelength conversion module 130 enters the transmission path of the laser beam 50B, and set the period of time as a first period of time, and may also control, by using the first actuator, the period of time during which the non-conversion region (not shown) of the wavelength conversion module 130 enters the transmission path of the laser beam 50B, and set the period of time as a second period of time.

In detail, in the first period of time, the at least one wavelength conversion region (not shown) of the wavelength conversion module 130 enters the transmission path of the laser beam 50B, and the laser beam 50B is converted into the at least one converted beam 60Y by the at least one wavelength conversion region (not shown) of the wavelength conversion module 130. In more detail, in the present embodiment, the wavelength conversion region of the wavelength conversion module 130 is composed of a wavelength conversion layer (not shown), so as to convert, into the converted beam 60Y, the laser beam 50B incident on the wavelength conversion region. For example, in the present embodiment, a wavelength conversion material includes phosphor capable of exciting a yellow beam, so that the converted beam 60Y formed after the laser beam 50B to be incident on the wavelength conversion layer is yellow light. In addition, in the second period of time, the non-conversion region (not shown) of the wavelength conversion module 130 enters the transmission path of the laser beam 50B. The non-conversion region (not shown) is configured to reflect the laser beam 50B to transmit the laser beam 50B to a subsequent optical element. In more detail, in the present embodiment, the non-wavelength conversion region of the wavelength conversion module 130 is, for example, a region on a metal substrate or formed by a reflecting layer coated on the substrate for reflecting the laser beam 50B.

Next, as shown in FIG. 2, in the first period of time, since the converted beam 60Y is yellow light, the at least one converted beam 60Y from the wavelength conversion module 130 can be reflected to the second condenser lens CL2 through the light splitting element DN and condensed onto the filter module 140 by the second condenser lens CL2. In addition, in the second period of time, after being reflected at the non-conversion region (not shown) of the wavelength conversion module 130, the laser beam 50B is transmitted to the second region R2 of the light splitting element DN through the first condenser lens CL1, and is transmitted to the filter module 140 through an optical element.

For example, in the present embodiment, the second region R2 of the light splitting element DN may be a partially-transmissive and partially-reflective element, so that a part of the laser beam 50B from the wavelength conversion module 130 is reflected at the second region R2 of the light splitting element DN, and the other part of the laser beam 50B passes through the second region R2 and is then transmitted to the subsequent light transmission element LT. In more detail, as shown in FIG. 2, in the present embodiment, the light transmission element LT is located on a transmission path of the laser beam 50B from the non-conversion region (not shown) of the wavelength conversion module 130. The second region R2 of the light splitting element DN is located between the wavelength conversion module 130 and the light transmission element LT. In this way, a part of the laser beam 50B is reflected at the second region R2 of the beam splitting element DN, and the other part of the laser beam 50B passes through the second region R2 of the beam splitting element DN and is then transmitted to the light transmission element LT. In addition, the other part of the laser beam 50B passing through the second region R2 is reflected by the light transmission element LT and penetrates the first region R1 of the beam splitting element DN. The part of the laser beam 50B reflected at the second region R2 and the other part of the laser beam 50B reflected by the light transmission element LT and penetrating the first region R1 have a same transmission direction, but are respectively incident on two sides of the subsequent second condenser lens CL2 to be condensed onto the filter module 140 by the condenser lens CL2.

As shown in FIG. 2, in the present embodiment, the filter module 140 is located on the transmission paths of the laser beam 50B and the converted beam 60Y, and has a filter region (not shown) and a light transmissive region (not shown). The filter module 140 further includes a second actuator (not shown) configured to drive the filter module 140 to rotate, so that the filter region (not shown) and the light transmissive region (not shown) correspondingly enter the transmission path of the converted beam 60Y or the laser beam 50B in different periods of time. For example, in the present embodiment, in different sub-periods of time in the first period of time, the filter region (not shown) of the filter module 140 correspondingly enters the transmission path of the converted beam 60Y to form first colored light and second colored light respectively. In the present embodiment, the first colored light and the second colored light are respectively red-color light and green-color light. In addition, in the second period of time, the light transmissive region (not shown) of the filter module 140 correspondingly enters the transmission path of the laser beam 50B transmitted to the filter module 140, to form blue-color light. In this way, the laser beam 50B and the converted beam 60Y can pass through the filter module 140 according to a timing to form illumination beams 70 of a plurality of different colors.

In addition, as shown in FIG. 2, in the present embodiment, the projection device 200 further includes a light homogenization element 150 located on a transmission path of the illumination beam 70 that is formed after the laser beam and the converted beam pass through the filter module 140. In the present embodiment, the light homogenization element 150 includes an integrated rod, but the disclosure is not limited thereto. In more detail, as shown in FIG. 2, when the illumination beam 70 formed by the laser beam 50B and the converted beam 60Y is transmitted to the light homogenization element 150, the light homogenization element 150 may homogenize the illumination beam and transmit the illumination beam to the light valve 210.

In addition, as shown in FIG. 2 to FIG. 4, the spot region modulation module 120 is located on the transmission path of the laser beam 50B between the wavelength conversion module 130 and the laser light source 110. The spot region modulation module 120 is configured to shift the transmission path of the laser beam 50B. In this way, when the wavelength conversion module 130 rotates, the spot region modulation module 120 moves, in the first period of time, the laser beam 50B in the wavelength conversion region along a first shift path SS1, so that the laser beam 50B forms a first spot region SP1 in an irradiation region in the wavelength conversion region. The spot region modulation module 120 causes, in the second period of time, the laser beam 50B to form a second spot region SP2 in an irradiation region in the non-conversion region. A size of the first spot region SP1 is greater than a size of the second spot region SP2.

In more detail, in the present embodiment, the spot region modulation module 120 includes a light guide element 121 and an actuator 122. The light guide element 121 is located on the transmission path of the laser beam 50B from the laser light source 110. The actuator 122 is electrically connected to the light guide element 121 and is configured to drive the light guide element 121 to move in at least two axial directions, so that the transmission path of the laser beam 50B generates a timing-based shift in at least two directions as a timing changes. For example, in the present embodiment, the light guide element 121 is a reflecting element configured to reflect the laser beam 50B to the wavelength conversion module 130, and the actuator 122 drives a normal direction of the light guide element 121 to shift as the timing changes. In this way, the spot region SP of the laser beam 50B can be moved in the wavelength conversion region through the movement of the light guide element 121, to form the first spot region SP1.

For example, as shown in FIG. 3, the laser beam 50B is incident on the wavelength conversion region and originally has a spot region SP. In addition, as shown in FIG. 4, when the light guide element 121 moves, the spot region SP of the laser beam 50B is successively moved in the wavelength conversion region along a first direction D1 and a second direction D2 to form the first shift path SS1. For example, as shown in FIG. 4, first, the light guide element 121 may cause the laser beam 50B not to shift in a first direction D1 but generate a second shift S2 along a second direction D2, and then generate a first shift S1 along the first direction D1 but no shift in the second direction D2. Then the actuator 122 moves the light guide element 121 in a reverse direction. A second shift S2 is generated along a direction opposite to the second direction D2, and then a first shift S1 is generated along a direction opposite to the first direction D1. In the present embodiment, the first direction D1 and the second direction D2 are orthogonal to each other, so that the first shift path SS1 can be formed. In addition, as shown in FIG. 3 and FIG. 4, since the spot region SP of the laser beam 50B can be moved in the wavelength conversion region along the first shift path SS1, a range of a wavelength conversion region actually irradiated by the laser beam 50B at this time is the first spot region SP1 actually irradiated by the spot region SP of the laser beam 50B moving along the first shift path SS1. In addition, in the present embodiment, the spot region modulation module 120 may not operate or may move by a very small amount in the second period of time.

Therefore, as shown in FIG. 3, a range of the second spot region SP2 is close to a range of the original spot region SP of the laser beam 50B. In this way, the first spot region SP1 with a size greater than a size of the second spot region SP2 can be obtained.

For example, in the present embodiment, shapes of the first spot region SP1 and the second spot region SP2 are rectangles, but the disclosure is not limited thereto. In other embodiments, the shapes of the first spot region SP1 and the second spot region SP2 may also be a circle or other shapes. In addition, in the present embodiment, when the wavelength conversion module 130 rotates at a rotation frequency, the spot region modulation module 120 may operate at a first frequency in the first period of time. The first frequency is greater than the rotation frequency of the wavelength conversion module 130.

In addition, it is worth noting that, in the present embodiment, the range of the second spot region SP2 may be close to the original spot region SP of the laser beam 50B, but the disclosure is not limited thereto. In another embodiment, the spot region modulation module 120 may also move the laser beam 50B in the non-conversion region along the second shift path during the second period of time, so that the laser beam 50B forms the second spot region SP2 in the irradiation region in the non-conversion region, provided that the size of the first spot region SP1 is greater than the size of the second spot region SP2. In other words, the spot region modulation module 120 may also operate at a second frequency in the second period of time. The second frequency may be zero or not. When the second frequency is not zero, the second shift path is formed.

In case of forming the second shift path, the spot region modulation module 120 may operate at a first amplitude in the first period of time, and operate at a second amplitude in the second period of time. The first amplitude is greater than the second amplitude. In this way, the first spot region SP1 with a size greater than a size of the second spot region SP2 can also be obtained. In addition, the spot region modulation module 120 may operate at a second frequency in the second period of time. The first frequency is greater than the second frequency, and the second frequency is 6 times the rotation frequency of the wavelength conversion module 130.

In this way, in the first period of time, conversion efficiency of the wavelength conversion module 130 can be improved by expanding the first spot region SP1 actually irradiated on the wavelength conversion region. In addition, in the second period of time, light receiving efficiency when the laser beam 50B enters the light homogenization element 150 can be improved by keeping a range actually irradiated on the non-conversion region to be close to the original spot region SP of the laser beam 50B or the second spot region SP2 smaller than the first spot region SP1. In this way, through the disposed spot region modulation module 120, consideration can be given to both the conversion efficiency of the wavelength conversion module 130 and the light receiving efficiency of the light homogenization element 150, so that the illumination system and the projection device have good optical efficiency, an optical path structure can be simplified, and a system volume can be reduced.

Figure 5A:
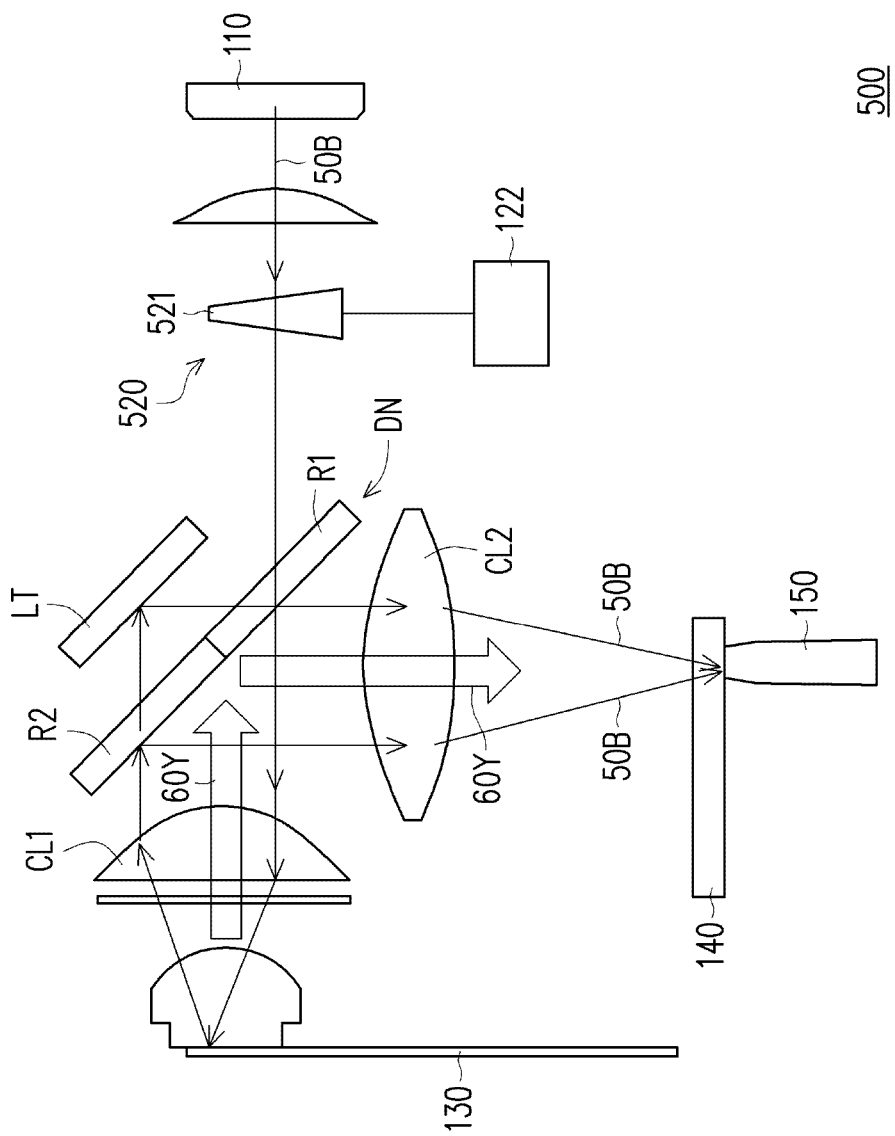
FIG. 5A is a schematic structural diagram of another projection device according to an embodiment of the disclosure.
Figure 5C:
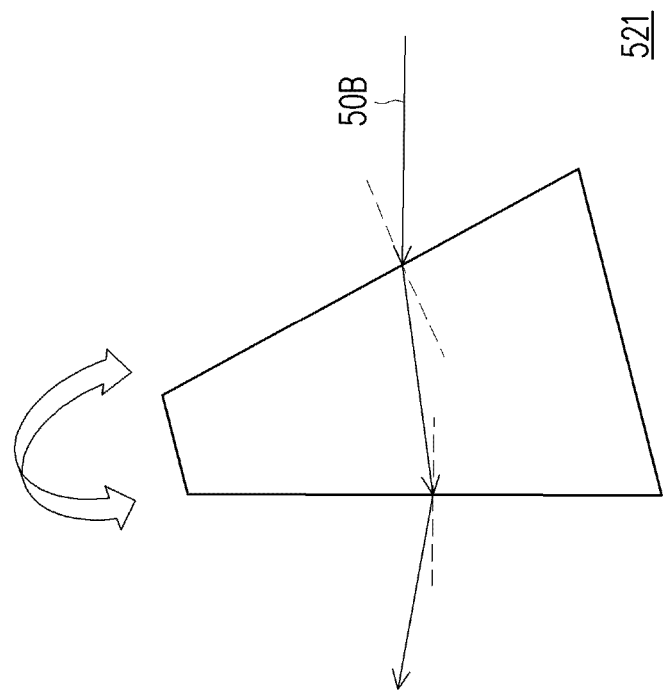
FIG. 5B and FIG. 5C are schematic diagrams of a light path passing through a light guide element in FIG. 5A.
Figure 5B:
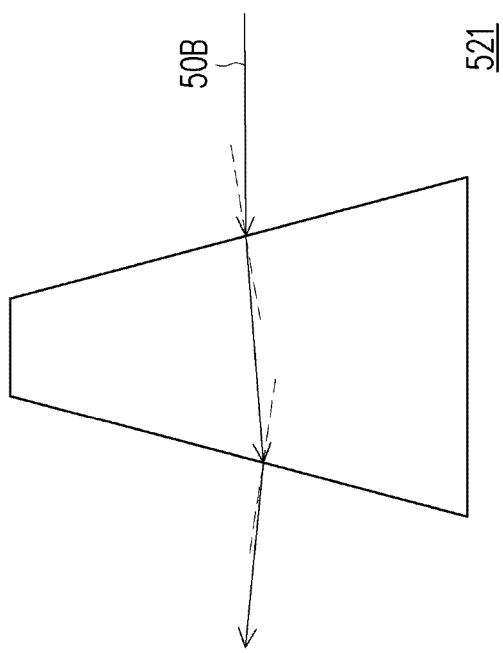

FIG. 5A is a schematic structural diagram of another projection device according to an embodiment of the disclosure. FIG. 5B and FIG. 5C are schematic diagrams of a light path passing through a light guide element 521 in FIG. 5A. Referring to FIG. 5A and FIG. 5C, an illumination system 500 in FIG. 5A is similar to the illumination system 100 in FIG. 1, and differences are as follows. In detail, as shown in FIG. 5A to FIG. 5C, in the present embodiment, the light guide element 521 of a spot region modulation module 520 of the illumination system 500 is a prism column with a varying thickness. In this way, the actuator 122 drives a normal direction of a light emitting surface of the light guide element 521 to move as the timing changes.

Further, as shown in FIG. 5A to FIG. 5C, when the laser beam 50B passes through the light guide element 521, the laser beam 50B may be refracted and then transmitted to the wavelength conversion module 130. In addition, the light guide element 521 is connected to the actuator 122. The actuator 122 can drive, through vibration, the normal direction of the light emitting surface of the light guide element 521 to move as the timing changes. In this way, when the laser beam 50B passes through the moving light guide element 521, the transmission path of the laser beam is also moved, so as to form a first shift path SS1 and a first spot region SP1 on the wavelength conversion region, thereby obtaining the first spot region SP1 with a size greater than a size of a second spot region SP2.

In this way, through the disposed spot region modulation module 520, the first spot region SP1 actually irradiated on the wavelength conversion region can also be expanded, thereby improving conversion efficiency of the wavelength conversion module 130. In addition, a range actually irradiated on the non-conversion region can also be kept to be close to the original spot region SP of the laser beam 50B or the second spot region SP2 smaller than the first spot region SP1, thereby improving light receiving efficiency when the laser beam 50B enters the light homogenization element 150. In this way, consideration can be given to both the conversion efficiency of the wavelength conversion module 130 and the light receiving efficiency of the light homogenization element 150, so that the illumination system 500 can achieve functions and advantages similar to functions and advantages of the above illumination system 100. The descriptions thereof are omitted herein. Moreover, when the illumination system 500 is applied to the projection device 200, the projection device 200 can also achieve the above effects and advantages. The descriptions thereof are omitted herein.

Figure 6:
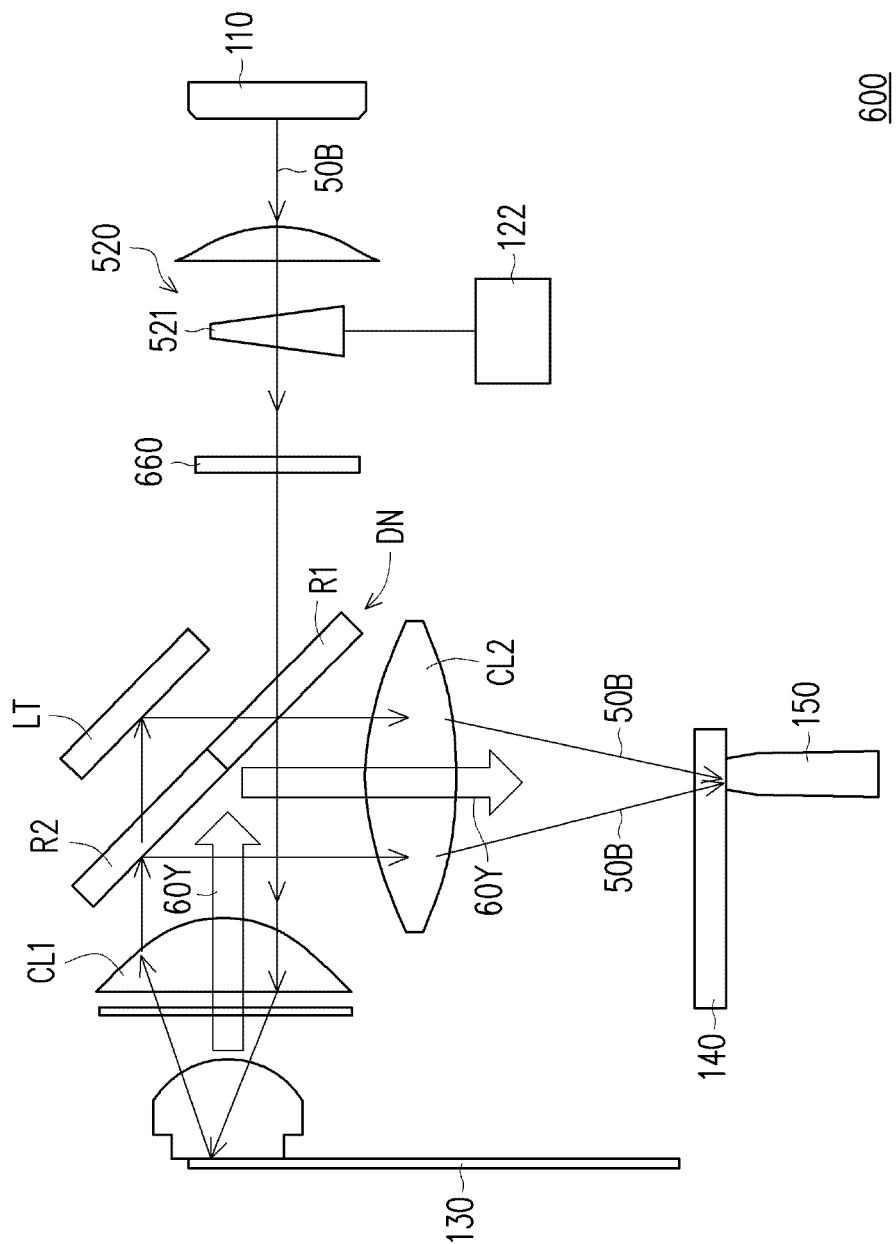
FIG. 6 is a schematic structural diagram of still another projection device according to an embodiment of the disclosure.

FIG. 6 is a schematic structural diagram of still another projection device according to an embodiment of the disclosure. Referring to FIG. 6, an illumination system 600 in FIG. 6 is similar to the illumination system 500 in FIG. 5A, and differences are as follows. In detail, as shown in FIG. 6, in the present embodiment, the illumination system 600 further includes a light diffusion element 660. The light diffusion element 660 is located between the wavelength conversion module 130 and the spot region modulation module 520. The light diffusion element 660 has a first region (not shown) and a second region (not shown). The first region of the light diffusion element 660 enters the transmission path of the laser beam 50B in the first period of time, and the second region of the light diffusion element 660 enters the transmission path of the laser beam 50B in the second period of time. A haze of the first region is greater than a haze of the second region, and the haze of the second region may be zero.

In this way, through the disposed spot region modulation module 520 and the light diffusion module 660, the first spot region SP1 actually irradiated on the wavelength conversion region can also be expanded, thereby improving conversion efficiency of the wavelength conversion module 130. In addition, since the haze of the second region is less than the haze of the first region, a range actually irradiated on the non-conversion region can also be kept to be close to the original spot region SP of the laser beam 50B or the second spot region SP2 smaller than the first spot region SP1, thereby improving light receiving efficiency when the laser beam 50B enters the light homogenization element 150. In this way, consideration can be given to both the conversion efficiency of the wavelength conversion module 130 and the light receiving efficiency of the light homogenization element 150, so that the illumination system 600 can achieve functions and advantages similar to functions and advantages of the above illumination system 500. The descriptions thereof are omitted herein. Moreover, when the illumination system is applied to the projection device 200, the projection device 200 can also achieve the above effects and advantages. The descriptions thereof are omitted herein.

In the above embodiments, although the projection device is exemplified by using the non-conversion region of the wavelength conversion module 130 to reflect the laser beam 50B, the disclosure is not limited thereto. In other embodiments, the non-conversion region of the wavelength conversion module 130 may also be penetrated through by the laser beam 50B. Any person skilled in the art can make appropriate changes to the optical path after referring to the disclosure, but the changes should still fall within the scope of the disclosure. Some embodiments are additionally listed below for description.

Figure 7:
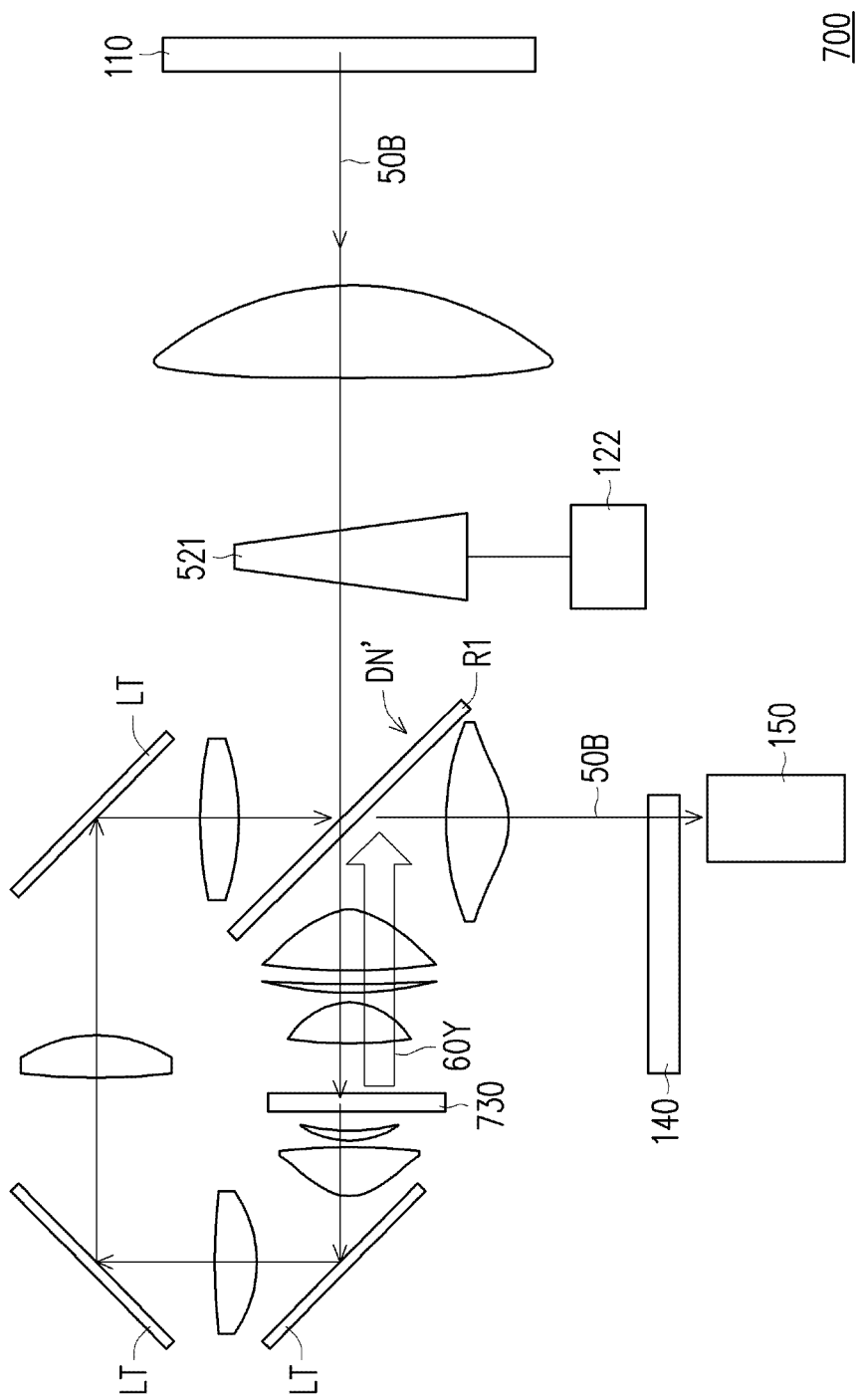
FIG. 7 is a schematic structural diagram of yet another projection device according to an embodiment of the disclosure.

FIG. 7 is a schematic structural diagram of yet another projection device according to an embodiment of the disclosure. Referring to FIG. 7, an illumination system 700 in the present embodiment is similar to the illumination system 500 in FIG. 5A, and differences between the two illumination systems are as follows. In the present embodiment, a non-conversion region of a wavelength conversion module 730 of the illumination system 700 is formed by a transparent substrate or a hollowed region. In other words, the non-conversion region of the wavelength conversion module 730 is to be penetrated through by the laser beam 50B. In addition, a beam splitting element DN' is composed of only the first region R1. In other words, in the present embodiment, the light splitting element DN' is penetrated through by only a blue beam but reflects beams of other colors (such as red, green, yellow, etc.).

In detail, as shown in FIG. 7, in the present embodiment, in the second period of time, the non-conversion region (not shown) of the wavelength conversion module 730 enters the irradiation range of the laser beam 50B. The laser beam 50B penetrates the non-conversion region of the wavelength conversion module 730, and is transmitted to the filter module 140 through the light transmission element LT and the light splitting element DN'. In addition, in the present embodiment, in the first period of time, at least one wavelength conversion region enters the irradiation range of the laser beam 50B. The laser beam 50B is converted into at least one converted beam 60Y by the at least one wavelength conversion region. Then, as shown in FIG. 7, the at least one converted beam 60Y from the wavelength conversion module 730 may be guided to the light splitting element DN' to be reflected to the subsequent filter module 140. The filter module 140 then separately forms the laser beam 50B and the at least one converted beam 60Y into red light, green light, and blue light, which then passes through the light homogenization element 150 to form subsequent illumination beam 70 and image beam 80.

In this way, through the disposed actuator 122 and light guide element 521 of the spot region modulation module, the first spot region SP1 actually irradiated on the wavelength conversion region can also be expanded, thereby improving conversion efficiency of the wavelength conversion module 730. In addition, a range actually irradiated on the non-conversion region can also be kept to be close to the original spot region SP of the laser beam 50B or the second spot region SP2 smaller than the first spot region SP1, thereby improving light receiving efficiency when the laser beam 50B enters the light homogenization element 150. In this way, consideration can be given to both the conversion efficiency of the wavelength conversion module 730 and the light receiving efficiency of the light homogenization element 150, so that the illumination system 700 can achieve functions and advantages similar to functions and advantages of the above illumination system 500. The descriptions thereof are omitted herein. Moreover, when the illumination system 700 is applied to the projection device 200, the projection device 200 can also achieve the above effects and advantages. The descriptions thereof are omitted herein.

Based on the above, the embodiments of the disclosure have at least one of the following advantages or effects. In the embodiments of the disclosure, in the first period of time, the illumination system and the projection device can expand an actual first spot region irradiating on the wavelength conversion region through the disposed spot region modulation module, thereby improving conversion efficiency of the wavelength conversion module. In addition, in the second period of time, through the disposed spot region modulation module, an actual region irradiated on the non-conversion region can be kept close to an original spot region of the laser beam or kept to be a second spot region smaller than the first spot region, thereby improving light receiving efficiency when the laser beam enters the light homogenization element. In this way, through the disposed spot region modulation module, consideration can be given to both the conversion efficiency of the wavelength conversion module and the light receiving efficiency of the light homogenization element, so that the illumination system and the projection device have good optical efficiency, an optical path structure can be simplified, and a system volume can be reduced.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An illumination system comprising a laser light source, a wavelength conversion module, and a spot region modulation module, wherein the laser light source is configured to provide a laser beam, the wavelength conversion module is located on a transmission path of the laser beam, wherein the wavelength conversion module has a wavelength conversion region and a non-conversion region and is configured to rotate on a rotation axis to cause the wavelength conversion region to enter the transmission path of the laser beam in a first period of time and to cause the non-conversion region to enter the transmission path of the laser beam in a second period of time, and the spot region modulation module is located on the transmission path of the laser beam between the wavelength conversion module and the laser light source, wherein the spot region modulation module is configured to shift the transmission path of the laser beam, and when the wavelength conversion module rotates, the spot region modulation module moves, in the first period of time, the laser beam in the wavelength conversion region along a first shift path, so that the laser beam forms a first spot region in an irradiation region in the wavelength conversion region, and the spot region modulation module causes, in the second period of time, the laser beam to form a second spot region in an irradiation region in the non-conversion region, wherein a size of the first spot region is greater than a size of the second spot region.

2. The illumination system according to claim 1, wherein the spot region modulation module moves, in the second period of time, the laser beam in the non-conversion region along a second shift path, so that the laser beam forms the second spot region in the irradiation region in the non-conversion region.

3. The illumination system according to claim 1, wherein the spot region modulation module comprises:

a light guide element located on the transmission path of the laser beam; and an actuator electrically connected to the light guide element and configured to drive the light guide element to move in at least two axial directions, so that the transmission path of the laser beam generates a timing-based shift in at least two directions as a timing changes.

4. The illumination system according to claim 3, wherein the light guide element is a reflecting element configured to reflect the laser beam to the wavelength conversion module, and the actuator drives a normal direction of the light guide element to move as the timing changes.

5. The illumination system according to claim 3, wherein the light guide element is a prism column configured to refract the laser beam and transmit the refracted laser beam to the wavelength conversion module, and the actuator drives a normal direction of a light emitting surface of the light guide element to move as the timing changes.

6. The illumination system according to claim 3, wherein a shape of the first spot region is a circle or a rectangle.

7. The illumination system according to claim 1, further comprising:
a light diffusion element located between the wavelength conversion module and the spot region modulation module, wherein the light diffusion element has a first region and a second region, the first region of the light diffusion element enters the transmission path of the laser beam in the first period of time, and the second region of the light diffusion element enters the transmission path of the laser beam in the second period of time, wherein a haze of the first region is greater than a haze of the second region.

8. The illumination system according to claim 1, wherein the spot region modulation module operates at a first amplitude in the first period of time, and the spot region modulation module operates at a second amplitude in the second period of time, wherein the first amplitude is greater than the second amplitude.

9. The illumination system according to claim 1, wherein the wavelength conversion module rotates at a rotation frequency, and the spot region modulation module operates at a first frequency in the first period of time, wherein the first frequency is greater than the rotation frequency of the wavelength conversion module.

10. The illumination system according to claim 9, wherein the spot region modulation module operates at a second frequency in the second period of time, wherein the first frequency is greater than the second frequency, and the second frequency is 6 times the rotation frequency of the wavelength conversion module.

11. A projection device comprising an illumination system, a light valve, and a projection lens, wherein
the illumination system is configured to provide an illumination beam and comprises a laser light source, a wavelength conversion module, and a spot region modulation module, wherein
the laser light source is configured to provide a laser beam,
the wavelength conversion module is located on a transmission path of the laser beam, wherein the wavelength conversion module has a wavelength conversion region and a non-conversion region and is configured to rotate on a rotation axis to cause the wavelength conversion region to enter the transmission path of the laser beam in a first period of time and to cause the non-conversion region to enter the transmission path of the laser beam in a second period of time, and
the spot region modulation module is located on the transmission path of the laser beam between the wavelength conversion module and the laser light source, wherein the spot region modulation module is configured to shift the transmission path of the laser beam, and when the wavelength conversion module rotates, the spot region modulation module moves, in the first period of time, the laser beam in the wavelength conversion region along a first shift path, so that the laser beam forms a first spot region in an irradiation region in the wavelength conversion region, and the spot region modulation module causes, in the second period of time, the laser beam to form a second spot region in an irradiation region in the non-conversion region, wherein a size of the first spot region is greater than a size of the second spot region,
the light valve is located on a transmission path of the illumination beam and is configured to convert the illumination beam into an image beam, and
the projection lens is located on a transmission path of the image beam and is configured to project the image beam out of the projection device.

12. The projection device according to claim 11, wherein the spot region modulation module moves, in the second period of time, the laser beam in the non-conversion region along a second shift path, so that the laser beam forms the second spot region in the irradiation region in the non-conversion region.

13. The projection device according to claim 11, wherein the spot region modulation module comprises:
a light guide element located on the transmission path of the laser beam; and
an actuator electrically connected to the light guide element and configured to drive the light guide element to move in at least two axial directions, so that the transmission path of the laser beam generates a timing-based shift in at least two directions as a timing changes.

14. The projection device according to claim 13, wherein the light guide element is a reflecting element configured to reflect the laser beam to the wavelength conversion module, and the actuator drives a normal direction of the light guide element to move as the timing changes.

15. The projection device according to claim 13, wherein the light guide element is a prism column configured to refract the laser beam and transmit the refracted laser beam to the wavelength conversion module, and the actuator drives a normal direction of a light emitting surface of the light guide element to move as the timing changes.

16. The projection device according to claim 13, wherein a shape of the first spot region is a circle or a rectangle.

17. The projection device according to claim 11, wherein the illumination system further comprises:
a light diffusion element located between the wavelength conversion module and the spot region modulation module, wherein the light diffusion element has a first region and a second region, the first region of the light diffusion element enters the transmission path of the laser beam in the first period of time, and the second region of the light diffusion element enters the transmission path of the laser beam in the second period of time, wherein a haze of the first region is greater than a haze of the second region.

18. The projection device according to claim 11, wherein the spot region modulation module operates at a first amplitude in the first period of time, and the spot region modulation module operates at a second amplitude in the second period of time, wherein the first amplitude is greater than the second amplitude.

19. The projection device according to claim 11, wherein the wavelength conversion module rotates at a rotation frequency, and the spot region modulation module operates at a first frequency in the first period of time, wherein the first frequency is greater than the rotation frequency of the wavelength conversion module.

20. The projection device according to claim 19, wherein the spot region modulation module operates at a second frequency in the second period of time, wherein the first frequency is greater than the second frequency, and the second frequency is 6 times the rotation frequency of the wavelength conversion module.

\* \* \* \* \*